May 15, 1956  J. F. McCASHEN  2,745,748
WHOLE GRAIN FLOURS AND PROCESS OF MAKING
Filed Nov. 4, 1948  3 Sheets-Sheet 1

INVENTOR.
JAMES F. McCASHEN
BY Richey & Watts
ATTORNEYS

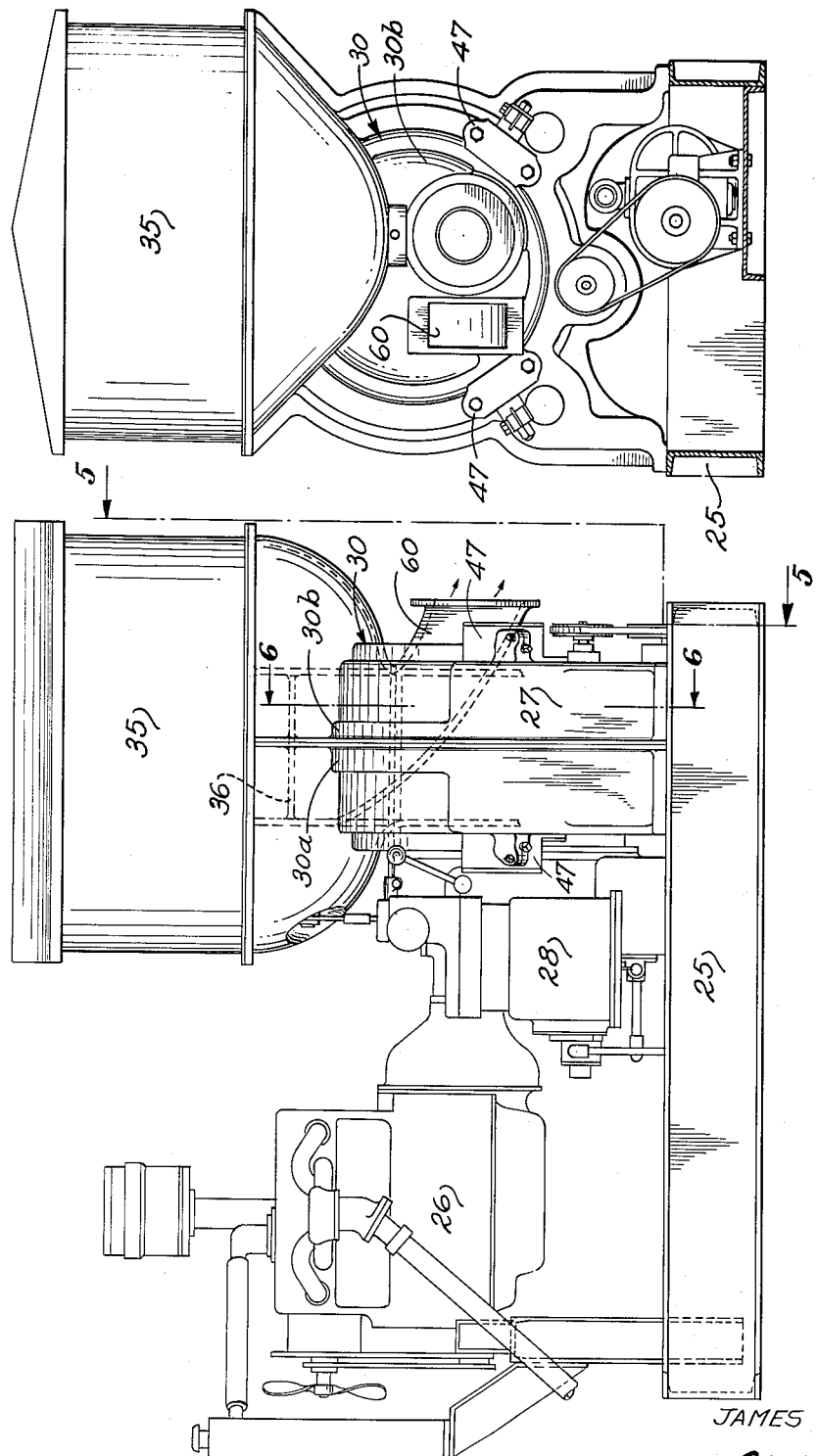

May 15, 1956          J. F. McCASHEN          2,745,748
WHOLE GRAIN FLOURS AND PROCESS OF MAKING
Filed Nov. 4, 1948          3 Sheets-Sheet 3

INVENTOR.
JAMES F. McCASHEN
BY
*Richey Watts*
ATTORNEYS ated May 15, 1956

United States Patent Office

2,745,748

WHOLE GRAIN FLOURS AND PROCESS OF MAKING

James F. McCashen, Rocky River, Ohio

Application November 4, 1948, Serial No. 58,319

14 Claims. (Cl. 99—93)

This invention relates generally to the art of food stuffs and particularly to new and improved flours of cereal grains and legumes, and to a new and improved method of making such flours.

Heretofore flours of various particle sizes have been made for consumption by humans or animals from various cereal grains, such as wheat, rice, corn, rye, barley, millet, oats and the like, and from various legumes including soybeans. Grinding, roll milling and hammer milling processes have been employed in converting the grains to flours for human consumption. These processes are similar in that the hulls constituting the outer covering of the cereal kernels are removed and separated in the form of rough edged, thin flakes, and the germ is broken away from, and is flattened out and is separated from, the endosperm or remaining materials of the kernels. Often the kernels are moistened or soaked with water to facilitate removal of the hulls. The discarded hull and germ materials have been used as, or in, animal feeds.

When it was discovered that the major parts of several nutritive and health-giving substances were being discarded with the hull and germ material, efforts were made to compensate for their loss in the flours for human consumption by adding certain substances to the finely divided endosperm material or flour. Among the substances which have been removed by prior processes and which are now being replaced in the flours to some extent are thiamin, niacin, pantothenic acid, riboflavin, pyridoxine, tocopherol and iron. These additions add to the cost of the grain product and some of the substances cannot be replaced effectively or without considerable difficulty.

When the prior processes were so carried out that part of, or all, the hulls went into the final product, the hull particles were often harmful to the human digestive system because of their rough edges which caused irritation to sensitive membranes. When part of, or all, the germ went into the final product, it tended to become rancid and to become infested with insects within short periods of time which varied somewhat depending on the grain involved. Apparently these conditions varied to some extent depending on the amount of moisture in the grains. Various efforts have been made to prevent such rancidity and insect infestation but, so far as I know, none of these expedients has been entirely satisfactory.

By the present invention I am able to make, from any of the foregoing or usual cereal grains and legumes, a flour product which possesses new properties and characteristics some of which are unexpected and unpredictable. Such a product contains substantially all the ingredients present in the original grain or legumes and hence obviates the replacement of ingredients removed by prior processes; it has no rough edged particles which would cause noticeable irritation to sensitive membranes in the human digestive tract; it has a lower moisture content than that of the grains or legumes from which it was made; it does not become rancid or infested with insects for periods of time which are unexpectedly long, the lengths of such periods varying with the kind of grains or legumes; and shortening need not be added to it preparatory to making bread or other baked products therefrom although shortening may be added when and as desired.

The present invention is predicated on the discovery that the foregoing prior art disadvantages and problems may be avoided or solved and the foregoing advantageous results may be obtained by comminuting cereal grain kernels, or legumes without separation of their constituent parts and without rupture of the walls of many of the oily-material-containing cells.

I believe that the disadvantages in the prior art cereal flours are traceable to the grinding or milling processes employed. I believe that moistening or wetting the kernels to facilitate hull removal increased the moisture content of the final product and promoted rancidity and insect infestation; that the hulls were inevitably removed in large particles with rough edges by the process and retained those edges even when further reduced in size and mixed with the other parts of the kernels; that the germs were inevitably flattened out by the grinding or roll milling processes and could not readily be reduced to the desired size; that the walls of the oil-containing cells of the germ were ruptured by the hammer mill process with resultant smearing of that oily material on the starchy material and thus was readily oxidized and made rancid and was available for insect development; and that when the germs did not go into the final product, shortening had to be added to compensate for the absence of the germ oil.

According to the present invention I reduce the kernels of cereal grains to particles which are of the desired size and which contain substantially all the ingredients and parts of the original or starting kernels. I may start with kernels which are dry or which have been moistened or wetted, or from which the hulls have been partly or wholly removed, but prefer to start with dry kernels which still retain their hulls. Cereal grains contain some moisture in the kernels even when the grain is said to be dry and does not carry any surface moisture. Wheat, for example, varies in moisture from about 7% to about 23% depending on the part of the world in which it is grown and whether it is winter or spring wheat. The average moisture content is from about 10½% to about 12½%, exclusive of Russian wheat, which has an average moisture content of about 16¾%.

Regardless of the condition of the starting kernels, I convert them into the small particles by what I believe is a combined cutting and splitting action which divides the oil cells along their boundaries without rupturing more than a small portion of the cell walls; and accomplish this result by intercepting the kernels and particles thereof while they are traveling at high velocity in the air with sharp wedge-like means traveling at a much higher velocity. The extremely high air currents created by the high speed of the comminuting means and the heat in the air resulting from impact serves to volatilize some of the moisture in the starting kernels with resultant lowered moisture content in the final product.

Generally speaking, about ¼% of the moisture is driven off during the first thirty seconds of comminuting action, and not more than about 1% is driven off during the first minute which is usually as long as it is necessary to carry on the comminuting action. When wheat kernels containing about 12½% of moisture are used, the resulting flour will contain about 11½% of moisture. Since most of the moisture of the kernels remains in the flour, the comminuting occurs in the presence of that moisture. It is believed that this moisture impedes rupture of the cell walls and that if the action is continued until the moisture is greatly reduced the walls of the oil and starch cells would be broken and entirely different flour would be obtained.

Apparently when the grains or particles which are traveling through the air are struck by the rapidly rotating comminuting means, the grains and particles are cut part way through and are then split the remainder of the way along the boundaries of the endosperm and germ cells. Doubtless some of the oil-cell walls are ruptured during this operation, but since there is no force present to wipe any thus liberated oil onto the starchy particles and the solid particles are moving rapidly in the air, the liberated oil does not adhere in substantial amounts to the starchy particle surfaces and may be atomized or volatilized and may escape into the air. The starch cells are not broken or ruptured in substantial quantities and as a result a minimum amount of malt sugar forms during fermentation and proteolytic action is almost entirely absent.

The present invention will be better understood by those skilled in the art from a specific description which is set forth hereinafter by way of illustration and not of limitation and from the accompanying drawings in which Fig. 1 is an enlarged view of a grain of wheat, with portions cut away, to expose various parts thereof;

Fig. 4 is a side elevational view of a portable unit suitable for carrying out this process and comprising a power plant, a cereal comminuting device and gearing connecting the two pieces of apparatus;

Fig. 5 is an end elevation, partly in section, taken on line 5—5 of Fig. 4; and

Figure 1:
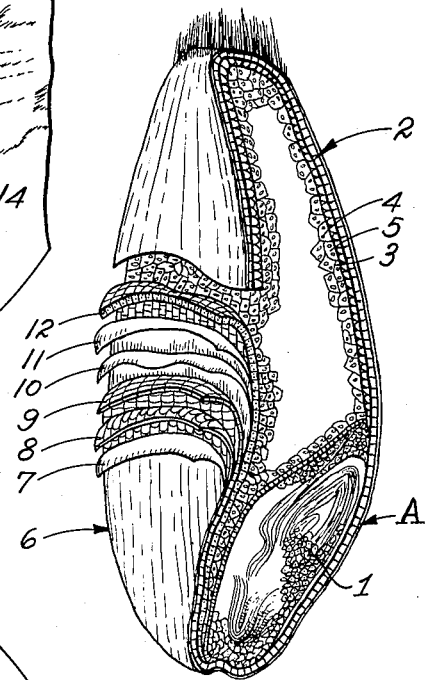

Fig. 1 shows the various parts of a grain of wheat according to the Wheat Flour Institute. In that figure the germ A is located at one end of the kernel or grain and consists, in part, of a quantity of oil or oily material enclosed in a large number of individual cells 1 defined by oil retaining walls. The endosperm comprises a plurality of individual cells 2 defined by cellulose walls 3 and containing starch granules 4 and gluten 5. The germ and endosperm are enclosed in a multi-layered hull 6 which is called the bran. These layers, beginning at the outer one and proceeding to the inner one, are, respectively, the epidermis 7, epicarp 8, endocarp 9, the testa 10, the episperm 11, and the aleurone 12. The aleurone consists partly of oil cells similar to cells 2 in the germ.

Figure 3:
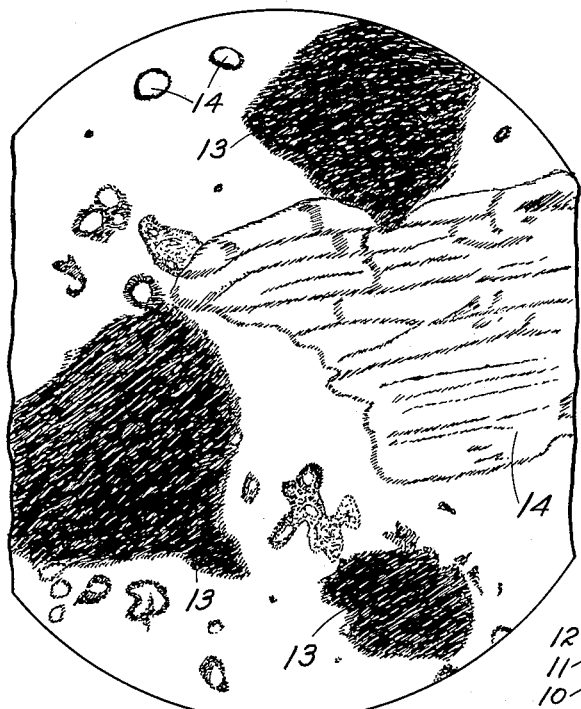
Fig. 3 is a view showing a higher powered photographic enlargement of oil cells and starch particles in the flour shown in Fig. 2.
Figure 2:
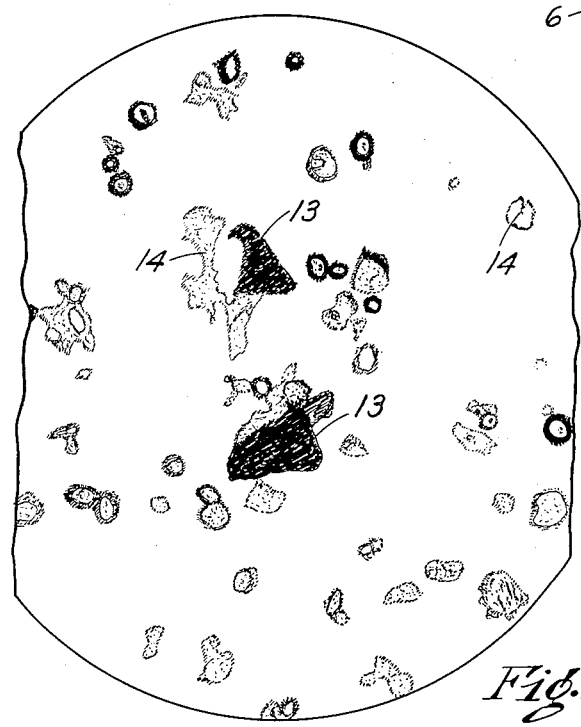
Fig. 2 is a view showing a photomicrographic enlargement of wheat flour embodying, and produced by, the present invention.

Figs. 2 and 3 show that flour made by the present invention from kernels of wheat comprises oil cells 13 and particles 14 which include bran and endosperm. All these particles are sharply cut or broken and are free from the rough surfaces and abrasive characteristics which are present in ground or milled wheat flour. Furthermore, the particles appear to be rounded and glutenized. When the flour was stained with Sudan III the oil-bearing cells took on a red color which is indicated by the black objects 13 in Figs. 2 and 3 while the starchy, cellulosic, hemi-cellulosic and protein materials 14 were unstained. The oil-bearing material, which I believe came from the germ and the aleurone layer of the bran, had a honeycombed appearance due to the presence of many individual cells connected together and those cells appeared to be intact and to have unbroken walls. Very little oily material could be detected on the starchy material.

A quantity of kernels of dry, bran-carrying wheat of a type suitable for making bread and containing about 12¼% of moisture was comminuted according to the present invention for about 54 seconds. About 39.9% of the resulting flour remained on a 40 mesh screen, about 58.6% of it remained on a 60 mesh screen, and the remainder was made up of coarser and finer particles. Flour of finer or larger particle sizes may readily be made but, in this particular instance, the particles were of the sizes just stated. This flour had a moisture content of about 11.4%, an ash content (15% moisture basis) of about 1.76%, and a protein content (15% moisture basis) of about 11.45%. It contained about 2.01 mgs. of thiamin per pound, about 18.22 mgs. of niacin per pound, and about 19.24 mgs. of iron per pound.

This flour was held under normal room temperatures and atmospheres, in the summer time in the Eastern part of the United States, for about eight weeks without any evidence of rancidity or insect infestation. Then, for the next three weeks, it was held in an atmosphere of relatively low humidity at a temperature of about 80° F. without any evidence of rancidity or insect infestation. Then it was held at a temperature of about 98° F. in an atmosphere of relatively low humidity for an additional twelve weeks, at the end of which time it showed no insect infestation and only slight rancidity.

Whole wheat bread made from that flour after it had been subjected to the foregoing temperatures and atmospheres for the first above mentioned eight weeks period contained about 1.22 mgs. of thiamin per pound of bread. Other bread, baked from the flour after it had been held for the first above described eleven weeks period and also after it had been held for the full above described twenty-three weeks contained about 1.32 mgs. of thiamin per pound of bread.

This flour possessed satisfactory baking properties and the bread made from it was even more tasty than bread made from flour produced from similar wheat by prior methods, and its nutritive value, as indicated by the thiamin, niacin and iron contents, was quite satisfactory.

Baking tests have demonstrated that flour made by this invention possesses many unexpected and unpredictable properties. One of these properties is that shortening need not be added to the flour of this invention, as is customary with flours produced by prior methods. I believe that this fact is traceable to the retention in the flour of the oil or oily material originally in the kernels.

Another of such properties is that the flour has considerable fermentation tolerance, due to the absence of proteolytic action or the tendency to become sticky during fermentation and, therefore, requires an active fermentation. Such fermentation may be obtained by the use of 5% of yeast in a sponge fermentation for five hours.

Another of such properties is the fact that since only a minimum amount of malt sugar is formed during fermentation and a vigorous fermentation which necessitates the presence of sugar is required, sugar may be added. Due to the control which may be had over the amount of sugar present and over the amount of lactic acid produced, the palatability of the resulting bread which depends on the amounts of lactic acid and sugar may be controlled. As much as 15% of cane sugar may be used to produce a sweet tasting loaf of bread from wheat embodying this invention.

The amount of moisture in flours made from cereal grain kernels and legumes may be varied by varying the amount of air which flows through the comminuting apparatus.

From the foregoing illustrated, but not limiting, description and statements it will be understood that whole wheat flour embodying the present invention is fundamentally different from whole wheat flour made by prior processes. It contains substantially all the ingredients of the original kernels and by far the largest portion of its starch and its oily material is in cells having unruptured walls and very little oily material is on the starchy particles. It has little tendency to become rancid even after long periods of exposure to high temperatures and under atmospheres of varying humidity, and is substantially free from insect infestation for greatly extended periods of time.

In contrast therewith, whole wheat flours made by prior processes and containing the germ have most of the oily material spread over the starchy particles and tend to become rancid and infected with insects in comparatively short periods of time. Furthermore, those prior flours either did not contain all the ingredients of the wheat kernel or contained rough, membrane irritating bran, particles, and shortening had to be added for baking if the germ part had been removed.

Results, comparable to the foregoing specific results, have been obtained with flours and meals made from grains other than wheat. For example, a quantity of kernels of corn was converted into meal by the present invention. That meal was left exposed to the varying temperatures and atmospheres during the summer in several places in the Eastern part of the United States and after more than three months of such exposure the meal was not rancid and had no insect infestation. This test is still in progress. Under similar conditions, corn meal made by the prior processes becomes infested with insects and becomes rancid, unless specially treated to prevent it, all within a few days.

This invention is applicable to most of, if not all, the cereal grains, including not only wheat and corn as above specifically mentioned, but also rye, barley, millet, oats, rice and the like and legumes, including soybeans. Flours and meals made from these various substances are generally similar in the respects that they contain substantially all the original ingredients of the starting materials, that most of the oil or oily material originally present in unbroken cells is retained in such cells and that very little of the oily material is spread on the starchy or other parts of the comminuted material.

This invention makes it possible to produce products which are suitable for human consumption, since such products may have various particle sizes, as desired, and contain the important ingredients of the starting material and thus avoid the necessity of adding such substances or their equivalents to the flours, as has been customary with the products of other processes. When a flour is desired which contains mixtures of flours of different grains or legumes, such a flour may be produced by this invention by simultaneously comminuting mixtures of the desired grains and legumes, or legumes.

The present invention is also useful in making straight or mixed animal feeds. The straight feeds may be made by comminuting a certain grain or legume and the mixed feeds may be made by mixing the desired grains or legumes, or both grains and legumes and simultaneously comminuting them; or each of the different desired starting materials may be comminuted separately by this invention and mixed thereafter.

A further advantage of the present invention is that flours may be made thereby which contain several intimately mixed ingredients which are necessary in making baked products and which have heretofore been mixed by the baker. For example, certain baked goods require the presence of milk in the flour. By the present invention a flour may be made which contains the finely divided particles of one or more cereal grains and one or more legumes, as above described, and also the desired amount of milk in powdered form. To make such flours, powdered milk may be added to the grain, or grain and legume, particles at any suitable time during the comminuting operation and will be thoroughly mixed with such particles in the final product. Similarly, other ingredients essential to various baking flour compositions may be incorporated during the comminuting operation, such as sugar, baking powder, soda and the like.

In this manner the present invention makes it possible, during the comminution of the cereal grain, mixtures of cereal grains, or mixtures or cereal grains and legumes, to include certain substances which are necessary in flour compositions for different food products and which have heretofore been added in separate operations.

Various means, devices and machines may be employed in carrying out the present method. The machine which is shown in my U. S. Patent No. 2,278,459 and is described in my U. S. Patent No. 2,327,280 is not suitable for this purpose because it is open at the ends and hence much of the starch in fine particle form would be lost by being carried out of the drum by air currents. It could be made suitable by adding parts thereto to prevent such loss while permitting the delivery of grain into the drum and the removal of the flour therefrom. Apparatus which is quite suitable for the purpose is shown in Figs. 4, 5 and 6.

Figure 6:
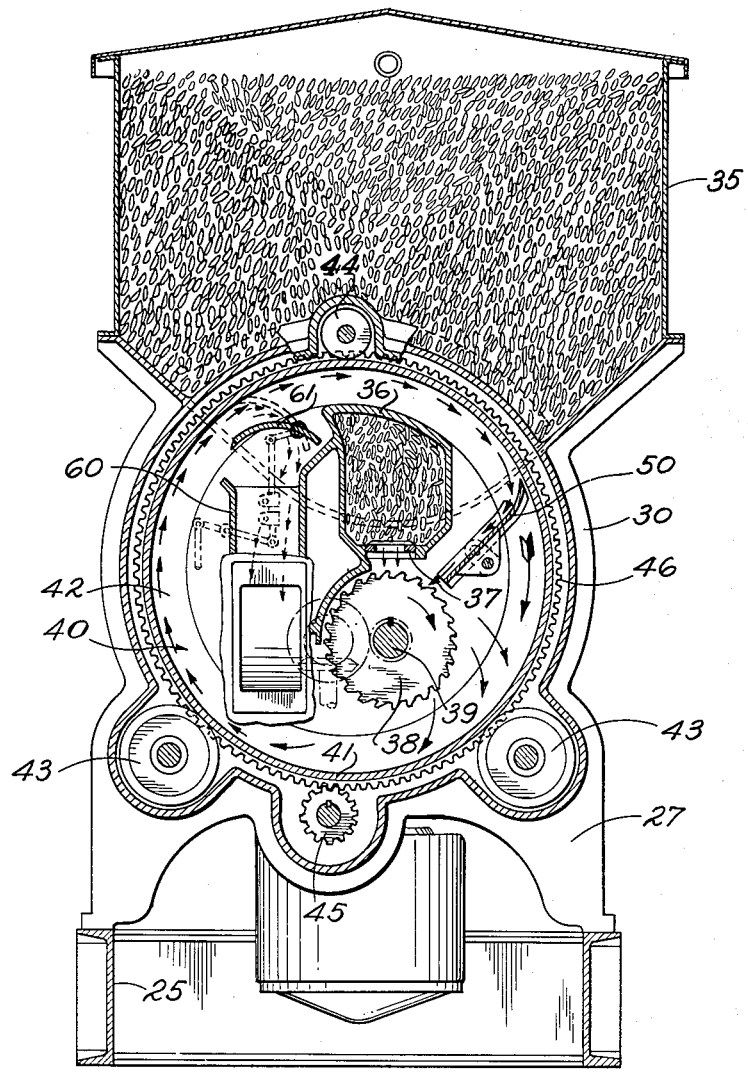
Fig. 6 is a vertical, sectional view taken on line 6—6 of Fig. 4.

In Figs. 4, 5 and 6, which show a portable unit, a metal frame 25 supports an internal combustion engine indicated generally at 26, a cereal comminuting device indicated generally at 27, and gear reducing means indicated generally at 28 for connecting the engine to the comminuting device. The comminuting device 27 comprises a housing 30 consisting of two generally similar parts 30a and 30b. When assembled as shown in Fig. 4, this housing is closed at its ends and has outlets to the outside atmosphere only through the cereal entry passages and the flour exit passage. A hopper 35 is mounted on the top of housing 30 and has passages leading through the opposite ends of the housing 30, which passages open into the ends of a feeder 36 within the housing. This feeder has a rotatable gate 37 at its bottom for the discharge of grain onto the comminuting means which comprises a plurality of disks 38 arranged in closely spaced position and keyed onto a horizontal shaft 39 which is mounted in bearings in the end walls of housing 30.

A cylindrical drum 40 comprising a cylindrical wall 41 and radial end walls 42, is disposed within the housing 30 and is mounted to rotate about a fixed horizontal axis between lower rollers 43 and upper roller 44 while being driven by a pinion 45 meshing with a rack 46 on the exterior of the cylindrical wall. Rollers enclosed in housings 47 at each end of the housing 30 prevent endwise movement of drum 40 while rotating. This drum surrounds the feeder 36 as will be seen in Fig. 6.

Above the comminuting means 38 is mounted a deflector bar 50. This bar may be moved to bring its upper end substantially into contact with the inner surface of the cylindrical wall 41 of the drum 40 or moved some distance away therefrom. It will be understood that when the drum is rotating at a sufficiently high linear speed solids coming into contact with the inner surface of wall 41 will be subjected to centrifugal force, will cling to and move with that wall and, therefore, can be moved in a closed circular path. Solids so moving may be deflected from deflector 50 onto the comminuting means 38 when the upper end of the deflector is brought substantially into contact with the inner surface of wall 41.

The comminuting means 38, as above indicated, consists of a plurality of thin metal disks keyed to a rotatable shaft 39. These disks are provided with toothed edges and are disposed at substantially right angles to wall 41 of the drum and some distance away from the inner surface of that wall. Solids deflected from wall 41 by deflector 50 will strike the toothed edges of these disks while traveling in the air and will be comminuted as will be described in somewhat more detail presently.

Means for removing comminuted solids from the drum 40 is shown within the drum opposite the deflector 50. This means includes a box 60 defining a substantially rectangular space having a discharge end outside of the adjacent end wall of housing 30 where it is open to the air or, preferably, is connected to a suitable hopper or bag holding spout. The top and bottom walls of this box are inclined downwardly at about a 45-degree angle so that flour coming into the box will flow readily down to its discharge end. At its upper end box 60 is provided with a cover 61 which is pivoted and is of such a size and shape as to partly close the upper end of box 60 in one position and to have one of its edges brought substantially into contact with the inner surface of wall 41 of drum 40 when solids are to be discharged from the interior of the drum.

The operation of the device shown in Figs. 4 to 6 and just described hereinabove is substantially as follows: A supply of grain to be comminuted is placed in the hopper 35 and the drum 40 and comminuting disks 38 are rotated at suitable speeds. The grain in hopper 35 fills feeder 36 and a quantity thereof flows out onto the comminuting means when gate 37 is opened. At this time the cover 61 on box 60 is closed. The falling grains are struck while in the air by the toothed edges of disks 38 and some are cut or broken into several parts while others, which may not have engaged the teeth on disks 38, may exist in their original form. All these solids fall onto the surface of wall 41 of the drum and are rotated in the direction shown by the arrows until they are intercepted by deflector 50 and again discharged onto the disks 38. This operation continues until the solids have been reduced to the desired size whereupon cover 61 is opened and the solids rotating with the drum are deflected into box 60 whence they are delivered through the discharge end thereof.

Good results were obtained in comminuting wheat to make whole wheat flour when the drum 40 was rotated at a linear speed of from about 800 feet to about 1500 feet per minute and when the linear speed of the peripheral portions of the disks was between about 10000 feet and about 14000 feet per minute.

When the drum and disks were rotating at those speeds and the feeder gate 37 and box door 61 were closed, the fine solids rotated and moved with the drum much as is indicated in Fig. 6. Some air pressure is built up within the drum during this time. When the box cover 61 is opened there is no tendency for air to enter the drum through box 60 because solids are being discharged through the drum and usually there is, as just stated, a slight air pressure above atmospheric in the drum. However, no such interior pressure exists when the feeder 36 is not substantially full of grain. When the process is carried out in a comminuting device into which air is controllably admitted, substantially all particles of the grain however small are retained and become parts of the eventual flour.

It is believed that a main reason for the freedom from insect infestation referred to hereinabove is traceable to the effect of the centrifugal force exerted on the insect eggs which are present on the grains and also to the substantial absence of oil on the starch particles. Apparently the centrifugal force ruptures the insect eggs and thus prevents hatching and growth of insects and the substantial absence of oil on starch particles, where it would be available as insect food, results in prompt starvation of any insects which may hatch out from eggs not ruptured by centrifugal force.

This application is a continuation-in-part of my copending application Serial No. 766,488, filed August 4, 1947, which was a continuation-in-part of my copending application Serial No. 706,793, filed October 30, 1946, which was a continuation-in-part of my original application, copending therewith, Serial No. 497,342, filed August 4, 1943. These applications have been abandoned each in favor of its continuation-in-part.

Having thus described the invention so that others skilled in the art may be able to understand and practice the same, I state that what I desire to secure by Letters Patent is defined in what is claimed.

What is claimed is:

1. A composition of matter comprising a cereal grain in the form of finely divided particles containing substantially all parts and ingredients of, and approximately the same moisture content as, the original kernels of grain, certain of said particles having rounded edges and non-abrasive surfaces and comprising hulls attached to starch.

2. A composition of matter comprising a cereal grain in the form of finely divided particles containing substantially all parts and ingredients of, and approximately the same moisture content as, the original kernels of grain, the major portion of the oily material of the grain being present in cells having unbroken walls, certain of said particles comprising starch and hull connected together.

3. A composition of matter comprising a cereal grain in the form of finely divided particles containing substantially all parts and ingredients of, and approximately the same moisture content as, the original kernels of grain, the major portion of the starch being present in cells having unbroken walls, some of the starch being connected to the outer hull of the original kernels.

4. A cereal grain flour in the form of finely divided particles consisting of substantially all parts of and ingredients of, and approximately the same moisture content as, the original kernels of grain, the major portion of the oily material and starch being present in cells having unbroken walls, certain of the particles comprising starch and hull connected together.

5. A composition of matter comprising wheat in the form of finely divided particles containing substantially all parts and ingredients of the original kernels of grain, the major portion of the starch and of the oily material of the grain being present in cells having unbroken walls, the moisture content of said particles being not more than about 1% below the moisture content of the whole kernels of grain, certain of the particles comprising oil-bearing cells and other particles comprising starch and bran connected together.

6. A wheat flour in the form of finely divided, rounded particles substantially free from rough edges and containing substantially all the endosperm, germ and bran of wheat kernels, a moisture content which is within about 1% of the moisture content of the whole wheat kernels, the major part of the starch and oily material being present in cells having unbroken walls, certain of the particles comprising oil cells and other particles comprising the bran of the wheat kernels connected to starch and cellulose of the kernels.

7. A whole wheat flour containing substantially all the thiamin, niacin, riboflavin and iron ingredients of the original wheat kernels and containing the major amount of the starch and of the oily material of the kernel in unbroken cells, the bran and endosperm of the kernels being connected together and present in the form of small particles.

8. A composition of matter comprising a mixture of at least two cereal grains in the form of finely divided particles containing substantially all of each of the ingredients of such grains including moisture, the hull material of the grains being attached to starch of those grains and present in the form of small particles.

9. A composition of matter comprising a mixture of at least one cereal grain and one legume in the form of finely divided particles containing substantially all of each of the ingredients of such grains including moisture, certain particles of the cereal grain comprising hull and starch of the grain connected together.

10. A baking flour composition comprising a mixture of finely divided particles of at least one cereal grain and at least one solid, finely divided baking flour ingredient, the flour particles containing a major part of the oily material in cells having substantially unbroken walls, and the hull of the cereal grain connected to starch thereof, and approximately all the moisture present in the cereal grain subjected to comminution.

11. The method of making a cereal flour which comprises the steps of subjecting cereal kernels and parts thereof, initially containing the normal amount of moisture, to centrifugal force and moving them in a substantially circular orbit, intercepting the oribtal movement of said kernels and particles at one part of the orbit and directing them through the air against rotating, sharp edged means and thereby partly cutting and partly splitting said kernels and parts while preserving in substantially unbroken condition the walls of oil containing cells therein, and repeatedly carrying out the foregoing steps in a confined space while preventing flow of gases therethrough until the kernels are converted into particles which contain substantially all parts and ingredients and approximately the initial moisture content of the kernels and are of such sizes that the majority will remain on a 60-mesh screen.

12. The method of making a cereal flour which comprises the steps of subjecting cereal kernels and parts thereof, initially containing the normal amount of moisture, to centrifugal force and moving them in a substantially circular orbit, intercepting the orbital movement of said kernels and particles at one part of the orbit and directing them through the air against rotating sharp edged means and thereby partly cutting and partly splitting said kernels and parts while preserving in substantially unbroken condition the walls of oil containing cells therein, and repeatedly carrying out the foregoing steps in a confined space while preventing flow of gases therethrough until the kernels are converted into particles which contain substantially all parts and ingredients and approximately the initial moisture content of the kernels and are of such sizes that approximately 40% will remain on a 40-mesh screen.

13. The method of making a cereal flour which comprises the steps of subjecting cereal kernels and parts thereof, initially containing the normal amount of moisture, to centrifugal force and moving them in a substantially circular orbit, intercepting the orbital movement of said kernels and particles at one part of the orbit and directing them through the air against rotating, sharp edged means and thereby partly cutting and partly splitting said kernels and parts while preserving in substantially unbroken condition the walls of oil containing cells therein, and repeatedly carrying out the foregoing steps in a confined space while preventing flow of gases therethrough until the kernels are converted into particles which contain substantially all parts and ingredients and approximately the initial moisture content of the kernels and are of such sizes that approximately 40% will remain on a 40-mesh screen and more than 50% will remain on a 60-mesh screen.

14. The method of making a cereal flour which comprises the steps of subjecting cereal kernels and parts thereof, initially containing the normal amount of moisture, to centrifugal force and moving them in a substantially circular orbit, intercepting the orbital movement of said kernels and particles at one part of the orbit and directing them through the air against rotating, sharp edged means and thereby partly cutting and partly splitting said kernels and parts while preserving in substantially unbroken condition the walls of oil containing cells therein, and repeatedly carrying out the foregoing steps in a confined space while preventing flow of gases therethrough until the kernels are converted into particles which contain substantially all parts and ingredients and approximately the initial moisture content of the kernels and are of such sizes that the majority will remain on a 60-mesh screen, and mixing at least one solid baking flour ingredient with the kernels to be comminuted.

References Cited in the file of this patent

UNITED STATES PATENTS

| | | |
|---|---|---|
| 1,916,773 | Shaler | July 4, 1933 |
| 1,957,688 | Blish | May 26, 1934 |
| 2,018,966 | Miller et al. | Oct. 29, 1935 |
| 2,278,459 | McCashen | Apr. 7, 1942 |

FOREIGN PATENTS

| | | |
|---|---|---|
| 691,460 | Germany | Apr. 30, 1940 |
| 110,532 | Australia | May 1940 |
| 117,834 | Australia | Jan. 15, 1930 |

OTHER REFERENCES

Winton: Structure and Composition of Foods, vol. I, John Wiley & Sons, 1932, pp 212 and 213.

Melick: Reader's Digest, 36, April 1940, pages 23–26.